Feb. 25, 1930.                R. W. JOY                  1,748,132
                          ARTICULATED CAR
                        Filed Nov. 6, 1928         3 Sheets-Sheet 1
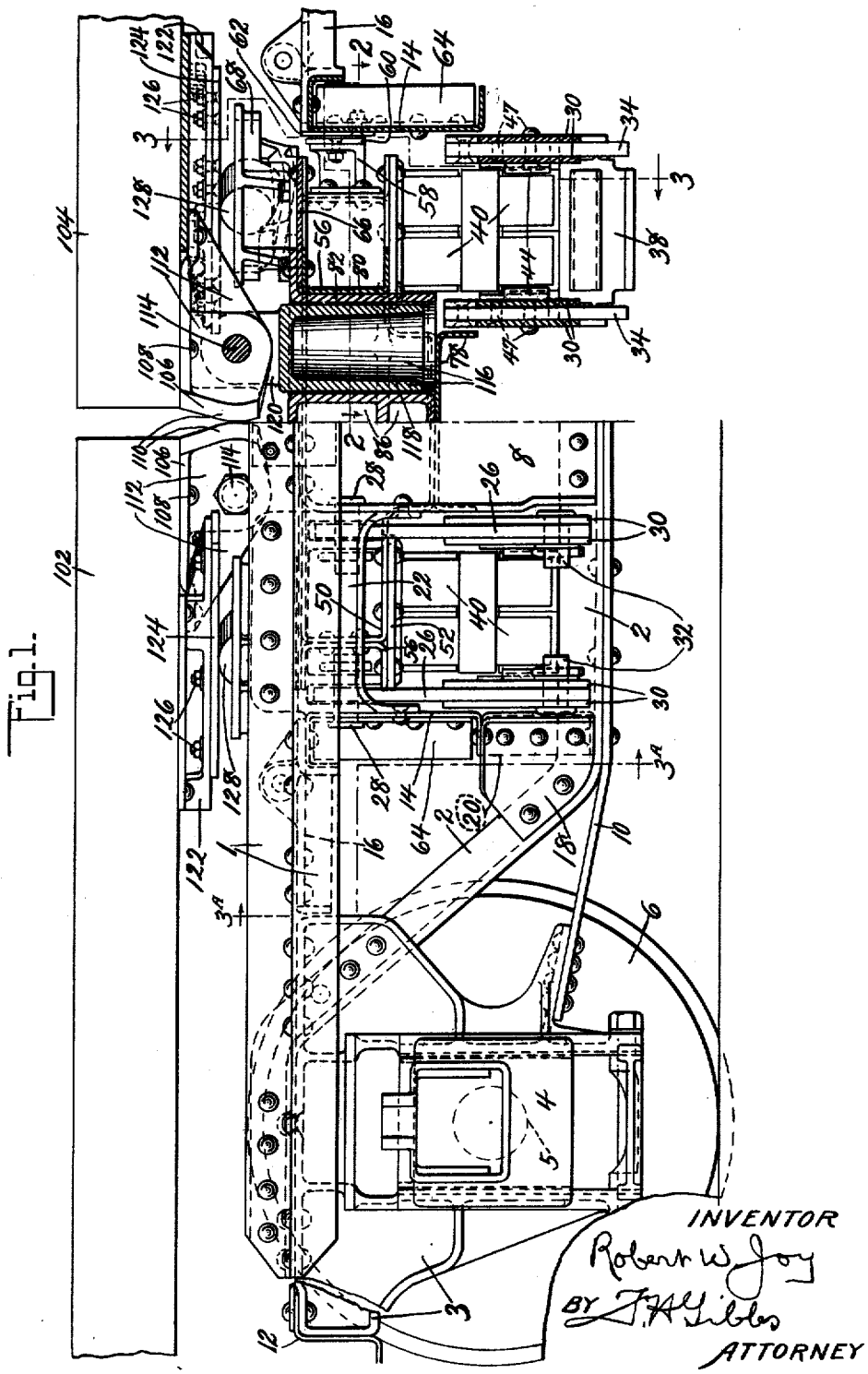

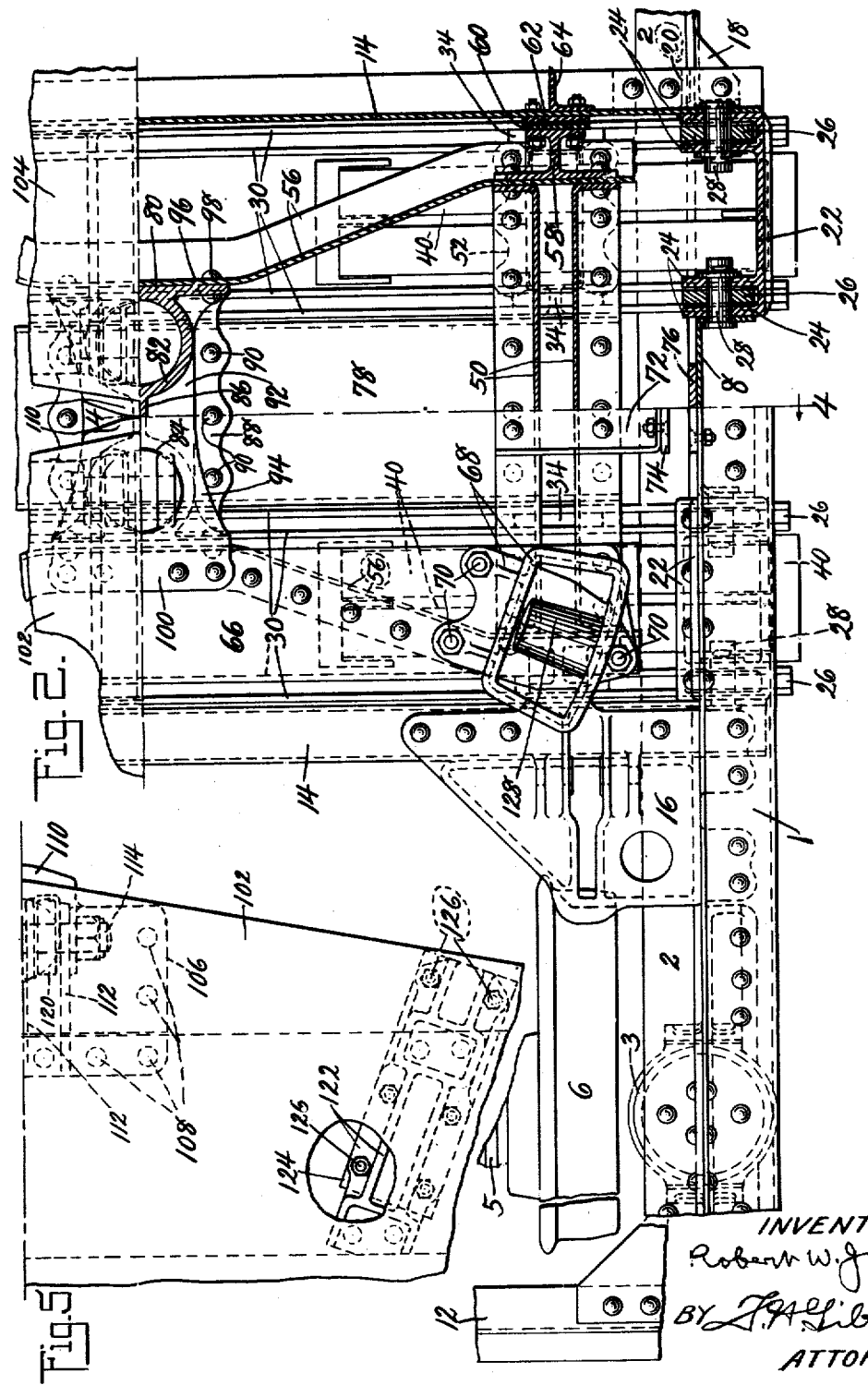

Feb. 25, 1930.  R. W. JOY  1,748,132
ARTICULATED CAR
Filed Nov. 6, 1922   3 Sheets-Sheet 3
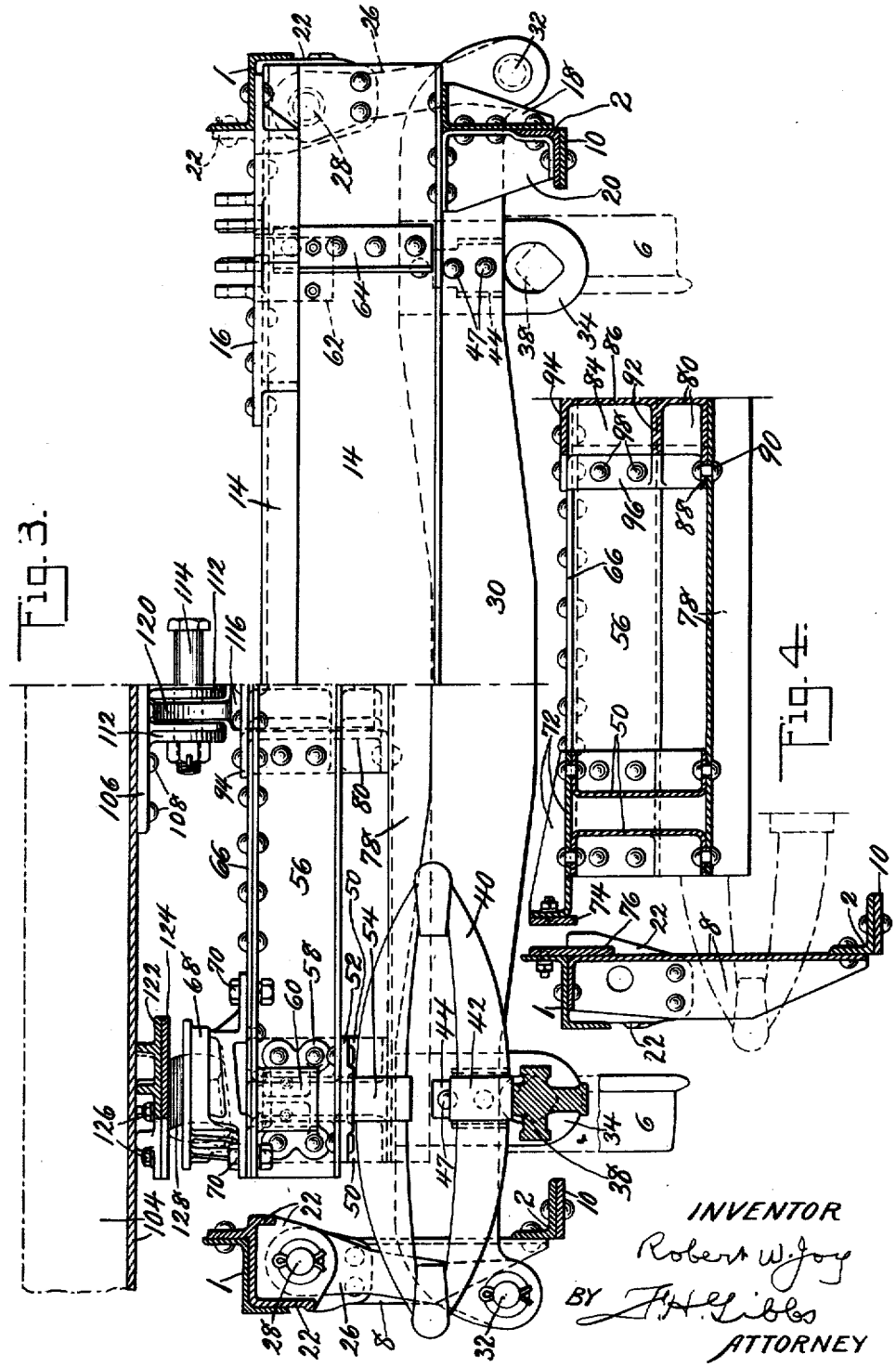
INVENTOR
Robert W. Joy
BY J. H. Gibbs
ATTORNEY Patented Feb. 25, 1930

1,748,132

UNITED STATES PATENT OFFICE

ROBERT W. JOY, OF BROOKLYN, NEW YORK, ASSIGNOR TO AMERICAN CAR AND FOUNDRY COMPANY, OF NEW YORK, N. Y., A CORPORATION OF NEW JERSEY

ARTICULATED CAR

Application filed November 6, 1928. Serial No. 317,502.

This invention relates to railway cars and more particularly to railway cars of the articulated type and it is an object of this invention to provide an improved articulated car in which the car bodies are supported entirely upon side bearings at the intermediate trucks; the buffing stresses are transmitted from car body to car body without being transmitted to the truck; and the draft strains are transmitted, where the intermediate truck is not a motor truck through a single member on the truck, which truck member serves as a pivot member for the car bodies but does not contribute to the actual support of the car bodies. It is also an object of this invention to provide an improved car truck to be used as an intermediate truck of an articulated car and which supports the car bodies in the manner indicated.

With these and other objects in view, as will appear more fully hereinafter, the invention consists substantially in the construction, combination, location and relative arrangement of the parts, all as will be more fully herein set forth, as shown in the accompanying drawings and finally pointed out in the appended claims.

In the drawings:

Figure 1 is a view partly in side elevation and partly in substantially central longitudinal section at an intermediate truck of an articulated car constructed in accordance with this invention;

Fig. 2 is a broken partial view in top plan and partly in horizontal section on the line 2—2 of Fig. 1 of the structure shown in Fig. 1, some parts being broken away to show other parts more clearly;

Fig. 3 is a view the left hand side of which is a vertical section taken on the line 3—3 of Fig. 1 and the right hand side of which is a vertical section taken on the line 3A—3A of Fig. 1;

Fig. 4 is a partial vertical transverse section taken on the line 4—4 of Fig. 2; and Fig. 5 is a top plan view of a fragment of one end of a car body, part being broken away to show the body side bearings more clearly.

As shown in the drawings, an articulated car constructed in accordance with this invention comprises a truck having side frames formed of Z-bar compression members 1 and angle bar tension members 2 joined together and to pedestal castings 3 at their ends. In the pedestals 3 are mounted journal boxes 4 in which are journaled axles 5 having wheels 6 mounted thereon. The tension members 2 are bent downwardly and spaced from the compression members 1 for the greater part of their length and at their centers the tension members 2 and compression members 1 are connected by diaphragms 8. Tie members 10 connecting the truck pedestals on each side of the truck are connected to the tension members 2 at the center of the truck. The side frames of the truck are connected at the ends of the truck by end frames 12 attached to the pedestal castings 3 and, adjacent the center of the truck, but spaced from the diaphragms 8, the side frames are connected by transoms 14 which are connected directly and by brake hanger support plates 16 to the compression members 1 and by pressed angle gussets 18 and 20 to the tension members 2.

Extending between the diaphragms 8 and transoms 14 are brackets 22 which are attached to the diaphragms 8, transoms 14 and compression members 1 and are provided with spaced pairs of ears or lugs 24 in which swing links 26 are pivotally mounted by means of pins 28. The lower ends of the oppositely positioned swing links 26 are joined by pairs of bars 30 extending transversely of the truck and between which the swing links are received and to which the swing links are pivotally connected by pins 32. Mounted between the pairs of bars 30 adjacent the swing links 26 are stirrups 34 which project below the bars 30 and are provided with openings in which are mounted adjustable spring supports 38. Mounted on the spring supports 38 are elliptical springs 40 held in position on the spring supports 38 by the engagement of the spring bands 42 by vertically arranged clips 44 secured to the bars 30 by the rivets 47 which secure the stirrups 34 thereto.

Extending longitudinally of the truck on each side thereof are pairs of pressed diaphragms 50 placed with their flanges projecting away from each other and at their ends mounted upon and secured to spring caps 52 which bear upon the upper spring bands 54 of the elliptical springs 40. The diaphragms 50 are of greater depth at their centers than at their ends, and at their ends are attached to pressed channels 56 which connect corresponding ends of the diaphragms on opposite sides of the truck; the diaphragms 50 and channels 56 forming a bolster frame which is supported at its corners by the springs 40. The channels 56 which also rest upon and are connected to the spring caps 52 are bent inwardly towards their centers so that the center portions of the two channels are much closer together than are their end portions. Where the channels 56 are attached to the diaphragms 50, brackets 58 are also secured; the brackets 58 carrying wear plates 60 detachably secured thereto and cooperating with wear plates 62 detachably secured to the webs of the transoms 14 to limit the motion of the transoms and channels longitudinally of the truck. The webs of the transoms 14 are reinforced by angles 64 where the wear plates 62 are mounted.

To the upper flanges of the channels 56 and the diaphragms 50 are attached top cover plates 66 which extend the full length of the channels 56 and at each end of the cover plates 66 side bearing castings 68 are attached. The bolts 70 which secure the side bearing castings 68 to the cover plates 66 serve also to secure the side bearing castings to the channels 56. To the upper flanges of the diaphragms 50 at the center thereof are attached brackets 72 which project outwardly from the diaphragms 50 and carry wear plates 74, the wear plates 74 cooperating with wear plates 76 mounted on the tension member 1 of the side frame and serving to limit the lateral movement of the transoms and channels.

To the bottom flanges of the diaphragms 50 at their deepened central portion is attached a pressed channel 78 which is secured beneath the diaphragm bottom flanges with its flanges projecting downwardly and which extends beneath all of the diaphragms. To the web of the channel 78 at its center there is attached a socket or pivot casting 80. The socket casting 80 is formed with spaced cylindrical walls 82 and 84 which form a plurality of sockets and which are joined by the vertical rib 86 and by a plurality of horizontal ribs; the bottom horizontal rib 88 serving as a means by which the socket casting is secured to the web of the channel 78 by the rivets 90. Both the bottom rib 88, intermediate rib 92 and the top rib 94 are joined to the walls 82 and 84 of the sockets and to the vertical rib 86 and are also extended to and united with the vertical webs 96. The vertical webs 96 serve as a means by which the socket casting is attached to the webs of the channels 56 by the rivets 98 and at their upper edges the webs 96 are formed with outwardly projecting flanges 100 which overlie the cover plates 66 and are attached to the cover plates 66 and to the upper flanges of the channels 56.

Supported upon the truck are the ends of a plurality of car bodies 102 and 104 provided with buffer castings 106 secured thereto as by the rivets 108. As shown, each of the buffer castings is provided with a curved downwardly extending buffing face 110 which is reinforced by the spaced ribs 112. The ribs 112 are provided with openings in which pins 114 pivotally support the pivots 116. Each of the pivots 116 comprises a cylindrical portion 118 which fits a socket opening in the socket casting 80 and with an ear 120 which fits between the ribs 112, the ear 120 being provided with an opening to receive the pin 114. At each side of each car body adjacent the ends thereof are attached the body side bearing castings 122; the castings having wear plates 124 secured thereto as by bolts 126. The wear plates 124 engage rollers 128 mounted in the side bearing castings 68.

It will be noted that the sockets in the socket casting 80 are open at both ends and that the socket casting does not furnish any support for the car ends through the pivots 116 but merely furnishes a pivot about which the car ends may rotate; the entire support of the car ends being furnished by the side bearings 68. It will also be noted that the pivotal connection of the pivots 116 with the buffer castings 106 permits of movement of the car body with respect to the truck; the pivot 116 and the pin 114 furnishing what is essentially a universal connection between each car body and the truck. It will also be noted that in case of buffing strains transmitted from car body to car body that the strains will be transmitted directly through the buffing faces of the buffing members 106 and will not be transmitted through the pivots 116 and the socket casting 80. In the case of draft strains, the strains will be transmitted from one car body through its pivot 116 to the socket casting 80 and from the socket casting 80 through the other pivot 116 to the second car body. It will also be noted that the members which transmit the buffing and draft stresses are entirely free from the load of the car bodies and that the support of the car body upon the side bearings is entirely independent of either the buffing or draft stresses. It will also be noted that the points of support for the car bodies are directly over the springs for all movements of the bodies and truck.

It is to be noted that the drawings herein are for illustrative purposes only and that various changes in form and proportions of the device may be made within the scope of the appended claims without departing from the spirit of the invention.

What is claimed is:

1. In an articulated car, a plurality of bodies, a truck, cooperating side bearings on said bodies and truck for supporting the entire load of the adjacent ends of said bodies from said truck at all times and means on said bodies for transmitting the buffing stresses between said bodies independently of said truck.

2. In an articulated car, a plurality of bodies, a truck, cooperating side bearings on said bodies and truck for supporting the entire load of the adjacent ends of said bodies from said truck at all times and independent pivotal connections between said bodies and truck.

3. In an articulated car, a truck having a plurality of spaced pairs of swing links on each side thereof, a plurality of groups of springs supported by said links on each side of said truck, diaphragms connecting the springs on each side of said truck, means connecting the diaphragms on opposite sides of the truck, side bearings carried by said diaphragms and a plurality of bodies having their adjacent ends mounted on said side bearings.

4. In an articulated car, a truck having a plurality of spaced pairs of swing links on each side thereof, a plurality of groups of springs supported by said links on each side of said truck, diaphragms connecting the springs on each side of said truck, means connecting the diaphragms on opposite sides of the truck, side bearings carried by said diaphragms, a plurality of bodies having their adjacent ends mounted on said side bearings and pivotal connections between said bodies and said diaphragm connecting means.

5. In an articulated car, a truck, a plurality of car bodies, side bearings on said truck supporting the entire load of the adjacent ends of said bodies and independent pivotal connections between said bodies and truck, said pivotal connections transmitting draft forces between said bodies.

6. In an articulated car, a truck, a plurality of car bodies, side bearings on said truck supporting the entire load of the adjacent ends of said bodies, means on said bodies for transmitting buffing stresses between said bodies independently of said truck and pivotal connections between said bodies and truck, said pivotal connections transmitting draft forces between said bodies.

7. In an articulated car, a truck, a plurality of car bodies, means on said bodies for transmitting buffing stresses between said bodies and means pivotally connected to said bodies for pivotally connecting said bodies and truck.

8. In an articulated car, a truck, a plurality of car bodies, side bearings on said truck supporting the adjacent ends of said bodies, means on said bodies for transmitting buffing stresses between said bodies and means pivotally connected to said bodies for pivotally connecting said bodies and truck.

9. In an articulated car, a truck, a plurality of car bodies, side bearings on said truck supporting the adjacent ends of said bodies, means on said bodies for transmitting buffing stresses between said bodies and means pivotally connected to said buffing means for pivotally connecting said bodies and truck.

10. In an articulated car, a truck having a plurality of spaced springs swingingly mounted on each side thereof, longitudinal members mounted on the springs at each side of the truck, transverse means joining the ends of said longitudinal members, side bearings mounted on said longitudinal members, a pivot member joining said transverse members at the centers thereof, a plurality of bodies having their adjacent ends supported on said side bearings and means on said bodies cooperating with said pivot member to pivotally connect said bodies and truck.

11. In an articulated car, a truck having a plurality of spaced springs on each side thereof, a frame supported at its corners on said springs, side bearings mounted on said frame, a pivot member carried by said frame, a plurality of car bodies supported on said side bearings and pivot members on said bodies cooperating with the pivot member on said truck.

12. In an articulated car, a truck having a plurality of spaced springs on each side thereof, a frame supported at its corners on said springs, side bearings mounted on said frame, a pivot member carried by said frame and having a plurality of openings therein, a plurality of car bodies carried on said side bearings and pivot members on said bodies engaging in the openings in said truck pivot member.

13. In an articulated car, a truck having a plurality of spaced springs on each side thereof, a frame supported at its corners on said springs, side bearings mounted on said frame, a pivot member carried by said frame and having a plurality of openings therein, a plurality of car bodies carried on said side bearings and pivot members on said bodies engaging in the openings in said truck pivot member, said truck pivot member transmitting draft strains from one car body to the other.

14. In an articulated car, a truck having a plurality of spaced springs on each side thereof, a frame supported at its corners on said springs, side bearings mounted on said frame, a pivot member carried by said frame and having a plurality of openings therein, a plurality of car bodies carried on said side bearings, pivot members on said bodies engaging in the openings in said truck pivot member and buffing means mounted on said car bodies.

15. In an articulated car, a truck having a plurality of spaced springs on each side thereof, a frame supported at its corners on said springs, side bearings mounted on said frame, a pivot member carried by said frame and having a plurality of openings therein, a plurality of car bodies carried on said side bearings and pivot members pivotally connected to said car bodies and engaging in the openings in said truck pivot member.

16. In an articulated car, a truck having a plurality of spaced springs on each side thereof, a frame supported at its corners on said springs, side bearings mounted on said frame, a pivot member carried by said frame and having a plurality of openings therein, a plurality of car bodies carried on said side bearings, buffer members mounted on said car bodies and pivot members pivotally connected to said buffing members and engaging in the openings in said truck pivot member.

17. In an articulated car, a truck having a plurality of spaced springs on each side thereof, a frame supported at its corners on said springs, side bearings mounted on said frame, a pivot member carried by said frame and having a plurality of openings therein, a plurality of car bodies carried on said side bearings, buffer members mounted on said car bodies and pivot members pivotally connected to said buffing members and engaging in the openings in said truck pivot member, said truck pivot member transmitting draft strains from one car body to the other.

18. In an articulated car, a truck, a plurality of car bodies, side bearings on said truck supporting the entire load of the adjacent ends of said bodies, pivotal connections between said bodies and truck and means on said bodies for transmitting buffing stresses between said bodies independently of said pivotal connections.

19. In an articulated car, a truck, a plurality of car bodies, side bearings on said truck supporting the entire load of the adjacent ends of said bodies, pivotal connections between said bodies and truck and means on said bodies for transmitting buffing stresses directly between said bodies.

In witness whereof I have hereunto set my hand.

ROBERT W. JOY.